United States Patent [19]

Fukuda et al.

[11] Patent Number: 4,646,153

[45] Date of Patent: Feb. 24, 1987

[54] NOISE REDUCTION CIRCUIT FOR A VIDEO SIGNAL

[75] Inventors: Hisatoshi Fukuda; Mitsuo Fujita, both of Yokohama, Japan

[73] Assignee: Victor Company of Japan, Ltd., Yokohama, Japan

[21] Appl. No.: 675,516

[22] Filed: Nov. 28, 1984

[30] Foreign Application Priority Data

Nov. 28, 1983 [JP] Japan .................................. 58-223753

[51] Int. Cl.⁴ ..................... H04N 5/213; H04B 1/10
[52] U.S. Cl. ................................. 358/167; 375/103; 455/307
[58] Field of Search ................. 358/167, 36, 31, 905; 455/296, 306, 307; 375/11, 12, 34, 99, 103

[56] References Cited

U.S. PATENT DOCUMENTS 4,101,837 7/1978 Clayton .............................. 455/307
4,243,956 1/1981 Lemoussu ........................... 375/12
4,404,600 9/1983 Murakami ......................... 358/167

FOREIGN PATENT DOCUMENTS 60186 5/1981 Japan ..................................... 358/31

Primary Examiner—Tommy P. Chin
Attorney, Agent, or Firm—Michael N. Meller

[57] ABSTRACT

A noise reduction circuit for a video signal, comprises a feedback type comb filter in which an output video signal of a delay circuit which delays a video signal by one or two horizontal scanning periods, is fed back to an input side of the delay circuit through a feedback path, and an equalizer circuit coupled in series with the feedback type comb filter. The feedback path comprises a highpass or bandpass filter circuit and a coefficient multiplier which are coupled in series. The equalizer circuit has a frequency characteristic complementary to an envelope characteristic in a frequency characteristic of the feedback type comb filter.

10 Claims, 11 Drawing Figures

PRIOR ART

NOISE REDUCTION CIRCUIT FOR A VIDEO SIGNAL

BACKGROUND OF THE INVENTION

The present invention generally relates to noise reduction circuits for video signals, and more particularly to a noise reduction circuit which comprises a filter circuit within a feedback loop of a feedback type comb filter and effectively reduces noise within an input video signal so as to improve the picture quality, by varying the feedback ratio responsive to the frequency.

Conventionally, a noise reduction circuit is provided in a luminance signal reproducing system of a helical scan type magnetic recording and/or reproducing apparatus (video tape recorder or VTR), for example, so as to reduce noise within a reproduced luminance signal after a frequency demodulation. For example, in a first conventional noise reduction circuit, the reproduced luminance signal which is reproduced from a magnetic tape and is demodulated in a frequency demodulator, is applied to an input terminal and is passed through a highpass filter so as to obtain only a frequency component of over 1 MHz, for example. An output signal of the highpass filter is passed through a limiter and a coefficient multiplier, and is supplied to a subtracting circuit. The subtracting circuit subtracts the output signal of the coefficient multiplier from the video signal (reproduced luminance signal, for example) applied to the input terminal. The noise which is visually conspicuous to the human eye, is generally concentrated in a low-level part of the high-frequency component. Hence, a video signal in which the visually conspicuous noise is eliminated, is produced from the subtracting circuit and is obtained through an output terminal.

On the other hand, in a second conventional noise reduction circuit, the video signal (reproduced luminance signal, for example) which is applied to an input terminal, is supplied to a 1H delay circuit wherein the video signal is delayed by a delay time of 1H, where H represents one horizontal scanning period. An output delayed video signal is supplied to a first subtracting circuit. The first subtracting circuit subtracts the output delayed video signal of the 1H delay circuit from the video signal applied to the input terminal. In the video signal, information contents which are separated by an interval of 1H are extremely similar to each other, and the so-called vertical correlation (line correlation) exists, as is well known. However, the vertical correlation does not exist for the noise. As a result, a signal made up of the noise and a video signal component having no vertical correlation, is obtained from the first subtracting circuit. The output signal of the first subtracting circuit is subjected to an amplitude limitation in a limiter which has a limiting level in the range of a peak-to-peak value of the noise. An output signal of the limiter is supplied to a second subtracting circuit which subtracts the output signal of the limiter from the video signal applied to the input terminal. Consequently, a video signal in which the noise is greatly reduced, is produced from the second subtracting circuit and is obtained through an output terminal.

Further, there is a third conventional noise reduction circuit comprising a feedback type comb filter. This third conventional noise reduction circuit will be described later in detail in conjunction with a drawing. According to the third conventional noise reduction circuit, a video signal (reproduced luminance signal, for example) is applied to an input terminal, and is supplied to the feedback type comb filter which eliminates the noise and obtains a video signal component having the vertical correlation. An output signal of the feedback type comb filter is supplied to a subtracting circuit which subtracts the output signal of the feedback type comb filter from the video signal applied to the input terminal, so as to obtain a signal made up of the noise included within the video signal and a video signal component having no vertical correlation. The output signal of the subtracting circuit is passed through a lowpass filter which obtains only a low-frequency component of the output signal of the subtracting circuit. The output signal of the feedback type comb filter has a predetermined characteristic after being passed through an equalizer circuit. The output signal of the lowpass filter and an output signal of the equalizer circuit are added in an adding circuit. As a result, a signal in which the noise is eliminated, is produced from the adding circuit and is obtained through an output terminal.

The frequency characteristic of the third conventional noise reduction circuit is flat in a frequency band under a cutoff frequency $f_c$ of the lowpass filter, but has a comb filter characteristic in a frequency band over the cutoff frequency $f_c$ so as to pass frequency components which are natural number multiples of a horizontal scanning frequency $f_H$. Thus, according to the third conventional noise reduction circuit, it is possible to eliminate the noise in the high-frequency band over the cutoff frequency $f_c$. Further, it is possible to prevent deterioration in the vertical resolution which is visually conspicuous in the low-frequency band under the cutoff frequency $f_c$.

However, in a case where the video signal applied to the input terminal has an edge of a large amplitude, a high-frequency component of the edge is obtained from the highpass filter in the first conventional noise reduction circuit described before. Thus, in the first conventional noise reduction circuit, the video signal and the noise in the vicinity of the edge are eliminated by the amplitude limitation performed in the limiter. As a result, there is a problem in that a video signal in which the edge noise still remains in the vicinity of the edge where the amplitude limitation is performed in the limiter, is produced from the subtracting circuit and is obtained through the output terminal.

Especially during a long-time mode of a VTR for home use, in which the recording and reproduction are carried out with respect to a given length of magnetic tape for a time which is longer than the recording and reproducing times during a normal mode by making the track width extremely narrow, the signall-to-noise (S/N) ratio of the reproduced video signal is poor because the track width is narrow and the relative linear speed between the magnetic tape and a head is slow. In addition, the crosstalk from adjacent tracks is large, and the edge noise is visually conspicuous in the reproduced picture. For this reason, the S/N ratio cannot be improved sufficiently according to the first conventional noise reduction circuit.

Further, in the VTR for home use, the noise is also distributed in the low-frequency band under 1 MHz. Since the first conventional noise reduction circuit is only effective with respect to the noise over the cutoff frequency of the highpass filter, it is also impossible to obtain the noise reducing effect with respect to the noise in the low-frequency band at parts other than the edge of the video signal.

In a case where the video signal applied to the input terminal has the vertical correlation, the second conventional noise reduction circuit is superior compared to the first conventional noise reduction circuit in that the second conventional noise reduction circuit can eliminate the edge noise and improve the S/N ratio. However, although the S/N ratio can be improved theoretically by 3 dB, the S/N ratio can only be improved by approximately 1.5 dB to 2.0 dB in actual practice. Moreover, the second conventional noise reduction circuit has a comb filter characteristic which passes frequencies which are natural number multiples of the horizontal scanning frequency $f_H$ to the same extent throughout the entire frequency band. As a result, the vertical resolution becomes deteriorated, and there is a problem in that the deterioration in the vertical resolution is visually conspicuous especially in the low-frequency band.

On the other hand, the third conventional noise reduction circuit is advantageous in that it is possible to reduce the edge noise described before. However, there is a problem in that the low-frequency noise (in the range of 1 MHz) which are visually conspicuous especially in the reproduced picture obtained in the VTR, cannot be reduced in the low-frequency band under the cutoff frequency $f_c$ of the lowpass filter. In this case, it is possible to reduce the low-frequency noise by lowering the cutoff frequency $f_c$ of the lowpass filter to a frequency in the range of 1 MHz, however, a coefficient of a coefficient multiplier within the feedback type comb filter must be set to a large value in order to obtain a desired S/N ratio improvement factor which is greater than the S/N ratio improvement factor obtainable in the second conventional noise reduction circuit. For this reason, the comb filter characteristic becomes sharp, and the vertical resolution is greatly deteriorated in the frequency band over the cutoff frequency $f_c$ of the lowpass filter. The deterioration in the vertical resolution is visually conspicuous in a frequency range of 1 MHz to 2 MHz. Hence, the cutoff frequency $f_c$ of the lowpass filter must inevitably be set to a frequency in the range of 2 MHz to 3 MHz, and it is virtually impossible to improve the S/N ratio in the low-frequency band by the desired improvement factor so as to reduce the low-frequency noise which are visually conspicuous especially in the reproduced picture obtained in the VTR.

SUMMARY OF THE INVENTION

Accordingly, it is a general object of the present invention to provide a novel and useful noise reduction circuit for a video signal, in which the problems described heretofore are eliminated.

Another and more specific object of the present invention is to provide a noise reduction circuit for a video signal, which comprises a highpass filter or a bandpass filter within a feedback loop of a feedback type comb filter, and passes an output signal of the feedback type comb filter through an equalizer circuit having a predetermined characteristic, so that an output video signal of the equalizer circuit is obtained through an output terminal. According to the noise reduction circuit of the present invention, it is possible to reduce the low-frequency noise which is visually conspicuous especially in the reproduced picture obtained in the VTR and improve the S/N ratio to such an extent that the vertical resolution is hardly deteriorated. Moreover, it is possible to greatly improve the S/N ratio in the high-frequency band, that is, by approximately 6 dB to 10 dB.

Still another object of the present invention is to provide a noise reduction circuit for a video signal, in which the output video signal of the equalizer circuit is supplied to an adding circuit through a subtracting circuit and a clipping circuit, and is also supplied directly to the adding circuit. According to the noise reduction circuit of the present invention, it is possible to obtain a variable frequency characteristic which is in accordance with the rate of the vertical correlation in the video signal. With respect to a video signal having a strong vertical correlation, it is possible to obtain from the adding circuit a video signal in which the noise is greatly reduced by the comb filter characteristic. On the other hand, with respect to a video signal having little vertical correlation, the filter characteristic is changed so as to pass the entire frequency band, and it is possible to obtain from the adding circuit a video signal having no deterioration in the vertical resolution.

A further object of the present invention is to provide a noise reduction circuit for a video signal, in which the output video signal of the equalizer circuit is supplied to a filter circuit which separates the video signal into a signal in a high-frequency band and a signal in a low-frequency band. The output signal of the filter circuit in the high-frequency band, is passed through a clipping circuit and is added with the output signal of the filter circuit in the low-frequency band. A signal which is obtained by this addition, is added with the output video signal of the feedback type comb filter, and is obtained through the output terminal.

According to the noise reduction circuit of the present invention, the vertical resolution is not deteriorated in a low-frequency band under a cutoff frequency of the filter circuit. In addition, when the vertical correlation exists in the video signal, it is possible to reduce the low-frequency noise which is visually conspicuous especially in the reproduced picture obtained in the VTR and improve the S/N ratio to such an extent that the vertical resolution is hardly deteriorated. Moreover, it is possible to greatly improve the S/N ratio in the high-frequency band. On the other hand, when there is no vertical correlation in the video signal, the operation of improving the S/N ratio is stopped, so as to accurately produce a video signal having virtually no deterioration in the vertical resolution. As a result, it is possible to prevent an error from being generated in the output video signal due to an operation of improving the S/N ratio at signal parts where the vertical correlation does not exist. Further, it is possible to obtain an optimum S/N ratio improvement factor by appropriately selecting respective cutoff frequencies of the filter circuit which is used for the band division and a bandpass filter within the feedback type comb filter.

Other objects and further features of the present invention will be apparent from the following detailed description when read in conjunction with the accompanying drawings.

DETAILED DESCRIPTION

Figure 1:
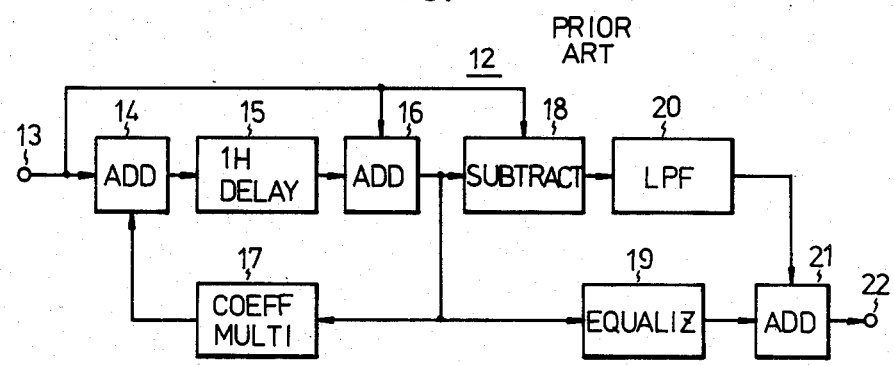
FIG. 1 is a systematic block diagram showing an example of a conventional noise reduction circuit.

A noise reduction circuit 12 shown in FIG. 1, is the third conventional noise reduction circuit described before. In FIG. 1, an input video signal (a reproduced luminance signal, for example) is applied to an input terminal 13, and is supplied to a 1H delay circuit 15 through an adding circuit 14, where H represents one horizontal scanning period of the input video signal. An output signal of the adding circuit 14 which is delayed by a delay time of 1H in the 1H delay circuit 15, is supplied to an adding circuit 16. The adding circuit 16 adds the output signal of the 1H delay circuit 15 and the input video signal applied to the input terminal 13, and produces a video signal component which has the vertical correlation and is reduced of the noise. The output video signal component of the adding circuit 16 is supplied to a coefficient multiplier 17 which multiplies a coefficient to the video signal component, and output signal of the coefficient multiplier 17 is fed back to the adding circuit 14.

The adding circuit 14, the 1H delay circuit 15, the adding circuit 16, and the coefficient multiplier 17, constitute a feedback type comb filter. The feedback type comb filter has a comb filter characteristic in which center frequencies of pass bands are even number multiples of ½ the horizontal scanning frequency $f_H$, and center frequencies of attenuation bands are odd number multiples of $f_H/2$.

An output signal of the feedback type comb filter, that is, the output signal of the adding circuit 16, is subtracted from the input video signal applied to the input terminal 13, in a subtracting circuit 18. As a result, a signal made up of the noise within the input video signal and a video signal component having no vertical correlation, is obtained from the subtracting circuit 18. The output signal of the subtracting circuit 18 is supplied to a lowpass filter 20 having a cutoff frequency $f_c$. Only a low-frequency component is obtained from the lowpass filter 20, and this low-frequency component is supplied to an adding circuit 21.

On the other hand, the output video signal of the adding circuit 16 is supplied to an equalizer circuit 19, and a signal having a predetermined characteristic is obtained from the equalizer circuit 19. The output signal of the equalizer circuit 19 is supplied to the adding circuit 21 and is added with the output low-frequency component of the lowpass filter 20. An output signal of the adding circuit 21 is obtained through an output terminal 22.

Figure 2:
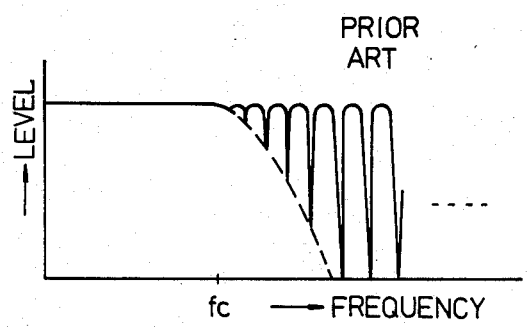
FIG. 2 shows a frequency characteristic of the block system shown in FIG. 1.

The conventional noise reduction circuit shown in FIG. 1, has a frequency characteristic shown in FIG. 2. As may be seen from FIG. 2, the conventional noise reduction circuit has a frequency characteristic which is flat in a frequency band under the cutoff frequency $f_c$ of the lowpass filter 20, and has a feedback type comb filter characteristic in which center frequencies of pass bands are natural number multiples of the horizontal scanning frequency $f_H$. For this reason, according to the conventional noise reduction circuit shown in FIG. 1, it is possible to reduce the noise in the high-frequency band over the cutoff frequency $f_c$, and it is possible to prevent deterioration in the vertical resolution which is visually conspicuous in the low-frequency band under the cutoff frequency $f_c$.

However, in this conventional noise reduction circuit, the cutoff frequency $f_c$ of the lowpass filter 20 is inevitably selected to a frequency in the range of 2 MHz to 3 MHz. Thus, as may be seen from the frequency characteristic shown in FIG. 2, there is a problem in that it is impossible to reduce the low-frequency noise (in the range of 1 MHz) which is visually conspicuous especially in the reproduced picture obtained in the VTR.

Next, description will be given with respect to embodiments of the noise reduction circuit according to the present invention, in which the problems of the conventional noise reduction circuit are eliminated.

Figure 3:
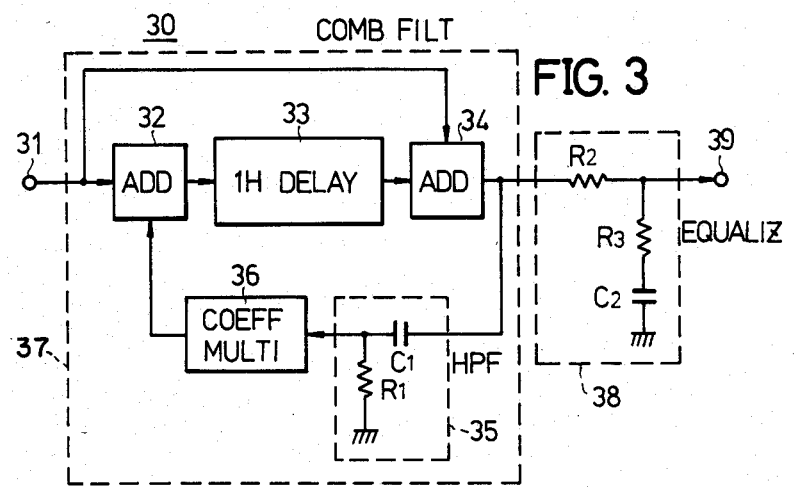
FIG. 3 is a systematic circuit diagram showing a first embodiment of a noise reduction circuit according to the present invention.

FIG. 3 shows a first embodiment of a noise reduction circuit 30 according to the present invention. In FIG. 3, an input video signal including noise, is applied to an input terminal 31. For example, the input video signal is a reproduced luminance signal which is obtained by reproducing a frequency modulated luminance signal from a recording medium and then passing the reproduced frequency modulated luminance signal through a de-emphasis circuit or the like. The input video signal is passed through an adding circuit 32 and a 1H delay circuit 33, and is supplied to an adding circuit 34. On the other hand, the input video signal is also supplied directly to the adding circuit 34. An output video signal of the adding circuit 34 is supplied to a highpass filter 35 which comprises a capacitor $C_1$ and a resistor $R_1$. The highpass filter 35 attenuates a low-frequency component under a cutoff frequency $f_{c12}$, and filters a high-frequency component. The output high-frequency component of the highpass filter 35 is supplied to a coefficient multiplier 36 which multiplies a coefficient k to the high-frequency component. An output signal of the coefficient multiplier 36 is supplied to the adding circuit 32 and is added with the input video signal, and the output signal of the adding circuit 32 is supplied to the 1H delay circuit 33.

In other words, the adding circuits 32 and 34, the 1H delay circuit 33, the highpass filter 35, and the coefficient multiplier 36, constitute a feedback type comb filter 37 in which the output video signal of the 1H delay circuit 33 is fed back to the input thereof. Hence, a video signal having a frequency characteristic in which the center frequencies of the pass bands are even number multiples of $f_H/2$ and the center frequencies of the attenuation bands are odd number multiples of $f_H/2$, is obtained from the adding circuit 34. In addition, according to the present embodiment, the feedback ratio of the high-frequency component over the cutoff frequency $f_{c12}$ is large, because the highpass filter 35 is provided in the feedback path which includes the coefficient multiplier 36 and extends from the output of the 1H delay circuit 34 to the input of the 1H delay circuit 34. The valve of the coefficient k with respect to the high-frequency component, essentially becomes larger compared to the value of the coefficient k with respect to the low-frequency component. Accordingly, the frequency characteristic obtained at the output of the adding circuit 34, is a comb filter characteristic in which the levels of the pass bands become larger and the pass bands become sharper (narrower) from the vicinity of the cutoff frequency $f_{c12}$ toward the higher frequencies, as may be seen from a feedback type comb filter characteristic shown in FIG. 4(A). The highpass filter 35 may be provided between the output of the coefficient multiplier 36 and the input of the adding circuit 32.

Next, description will be given with respect to an envelope characteristic I indicated by a phantom line in FIG. 4(A). The envelope characteristic I is obtained by connecting peak levels of the pass bands in the frequency characteristic of the feedback type comb filter 37. When it is assumed that the amplification of the 1H delay circuit 33 is equal to one, the coefficient k of the coefficient multiplier 36 is greater than zero and less than one, the feedback ratio obtained by the highpass filter 35 is represented by $\beta$, the input signal voltage applied to the input terminal 31 is represented by $e_i$, and the output signal voltage of the adding circuit 34 is represented by $e_o$, the output signal voltage $e_o$ can be described by an equation $e_o = (e_i + k \cdot \beta \cdot e_o) + e_i$. Thus, the transfer function of the feedback type comb filter 37 can be described by the following equation (1), when it is assumed that a perfect vertical correlation exists in the signal.

$$e_o/e_i = 2/(1 - k \cdot \beta) \quad (1)$$

When it is assumed that $C_1 \cdot R_1 = T$ because the highpass filter 35 comprises the capacitor $C_1$ and the resistor $R_1$, the following equation (2) can be obtained, where $\omega$ represents the angular frequency of the input signal.

$$\beta = j\omega T/(1 + j\omega T) \quad (2)$$

Accordingly, the following equation (3) can be obtained when the equation (2) is substituted into the equation (1).

$$e_o/e_i = 2(1 + j\omega T)/[1 + j\omega(1 - k)T] \quad (3)$$

The equation (3) describes the envelope characteristic I in the frequency characteristic of the feedback type comb filter 37. The envelope characteristic I is flat in the highfrequency band over the frequency $f_{c11}(= 1/[2\pi(1-k)C_1R_1])$ which is determined by $(1-k)T$, flat in the low-frequency band under the frequency $f_{c12}(f_{c12} = 1/(2\pi C_1 R_1))$, where $f_{c12}$ is less than $f_{c11}$) which is determined by T, and is attenuated at a rate of 6 dB/oct as the frequency decreases toward the frequency $f_{c12}$ from the frequency $f_{c11}$, as shown in FIG. 4(A). The level difference between the frequencies $f_{c11}$ and $f_{c12}$ can be described by $20 \log[1/(1-k)]$ dB.

Figure 4:
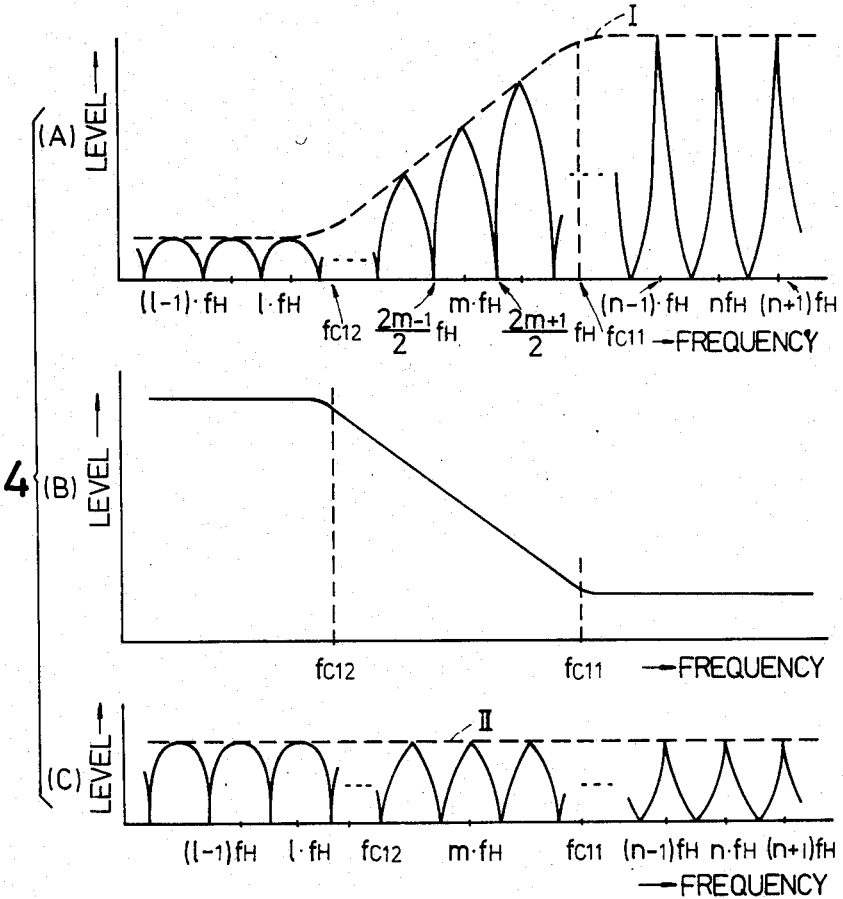
FIGS. 4(A) through 4(C) show frequency characteristics at each part of the circuit system shown in FIG. 3.

Therefore, as shown in FIG. 4(A), the feedback type comb filter 37 has the frequency characteristic in which the center frequencies of the pass bands are even number multiples of $\frac{1}{2}$ the horizontal scanning frequency $f_H$, and the pass bands are sharper (narrower) in the higher frequencies compared to the lower frequencies. A video signal which is obtained from the feedback type comb filter 37, is supplied to an equalizer circuit 38 which comprises resistors $R_2$ and $R_3$ and a capacitor $C_2$, and a signal having a predetermined characteristic is obtained from the equalizer circuit 38. The output signal of the equalizer circuit 38 is obtained through an output terminal 39. The equalizer circuit 38 has a frequency characteristic complementary to the envelope characteristic I in the frequency characteristic of the feedback type comb filter 37. Accordingly, the circuit construction of the equalizer circuit 38 becomes as shown in FIG. 3. As shown in FIG. 4(B), the frequency characteristic of the equalizer circuit 38 is flat in the frequency band under a first cutoff frequency $f_{c12}$, flat in the frequency band over a second cutoff frequency $f_{c11}$, and slopes at a rate of $-6$ dB/oct as the frequency increases from the first cutoff frequency $f_{c12}$ to the second cutoff frequency $f_{c11}$. The first cutoff frequency $f_{c12}$ is determined by a product of the capacitance of the capacitor $C_2$ and a sum of the resistances of the resistors $R_2$ and $R_3$. On the other hand, the second cutoff frequency $f_{c11}$ is determined by a product of the capacitance of the capacitor $C_2$ and the resistance of the resistor $R_3$. The constants of the circuit elements in the highpass filter 35 and the equalizer circuit 38 are thus selected as follows.

$$R_2 = k \cdot R_1$$

$$R_3 = (1-k)R_1$$

$$C_1 = C_2$$

The frequency characteristic of the noise reduction circuit 30 which exists between the input terminal 31 and the output terminal 39, is a sum of the frequency characteristic of the feedback type comb filter 37 shown in FIG. 4(A) and the frequency characteristic of the equalizer circuit 38 shown in FIG. 4(B). As a result, the frequency characteristic of the noise reduction circuit 30 becomes as shown in FIG. 4(C). As may be seen from FIG. 4(C), the noise reduction circuit 30 has a frequency characteristic in which the pass bands and the attenuation bands are the same as the pass bands and the attenuation bands in the frequency characteristic of the feedback type comb filter 37 throughout the entire frequency band, the pass bands gradually become sharper (narrower) toward the higher frequencies in the frequency band between the frequencies $f_{c12}$ and $f_{c11}$, and the pass bands are sharpest (narrowest) in the high-frequency band over the frequency $f_{c11}$. Further, the envelope characteristic in the frequency characteristic of the noise reduction circuit 30, that is, a peak frequency characteristic in the comb filter characteristic, is substantially flat throughout the entire frequency band as indicated by a phantom line II in FIG. 4(C). In FIGS. 4(A) through 4(C), coefficients l, m, and n are natural numbers, and satisfy a relation $l < m < n$. The same coefficients are used in FIGS. 6(A) through 6(E) which will be described later on.

According to the present embodiment, the noise reduction circuit 30 blocks the frequency components having frequencies which are odd number multiples of $\frac{1}{2}$ the horizontal scanning frequency $f_H$. As a result, it is possible to reduce the noise which is mixed in the input signal (reproduced luminance signal) approximately throughout the entire frequency band. Because the noise reduction circuit 30 shows a narrow comb filter characteristic especially toward the high-frequency band, it is possible to greatly reduce the noise in the high-frequency band. In addition, the cutoff frequency $f_{c12}$ of the highpass filter 35 is in the range of 800 kHz, for example, and is sufficiently low compared to the cutoff frequency $f_c$ of the lowpass filter 20 within the conventional noise reduction circuit 12 shown in FIG. 1. For this reason, it is possible to greatly reduce the low-frequency noise which is visually conspicuous especially in the reproduced picture obtained from the VTR. Moreover, according to the present embodiment, the pass bands are wider in the low-frequency band under the frequency $f_{c12}$, and the pass bands are narrower in the high-frequency band over the frequency $f_{c11}$. Thus, it is possible to obtain a S/N ratio improvement factor which is approximately in the same range as the S/N ratio improvement factor obtainable in the conventional noise reduction circuit 12 shown in FIG. 1.

Figure 5:
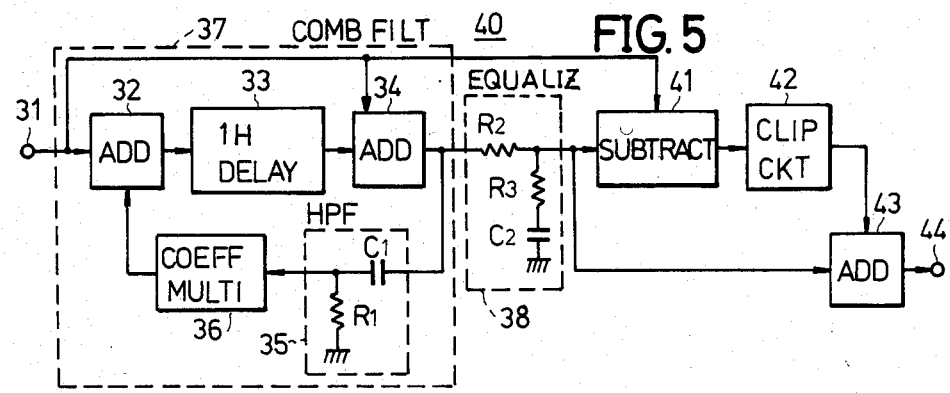
FIG. 5 is a systematic circuit diagram showing a second embodiment of the noise reduction circuit according to the present invention.
Figure 6:
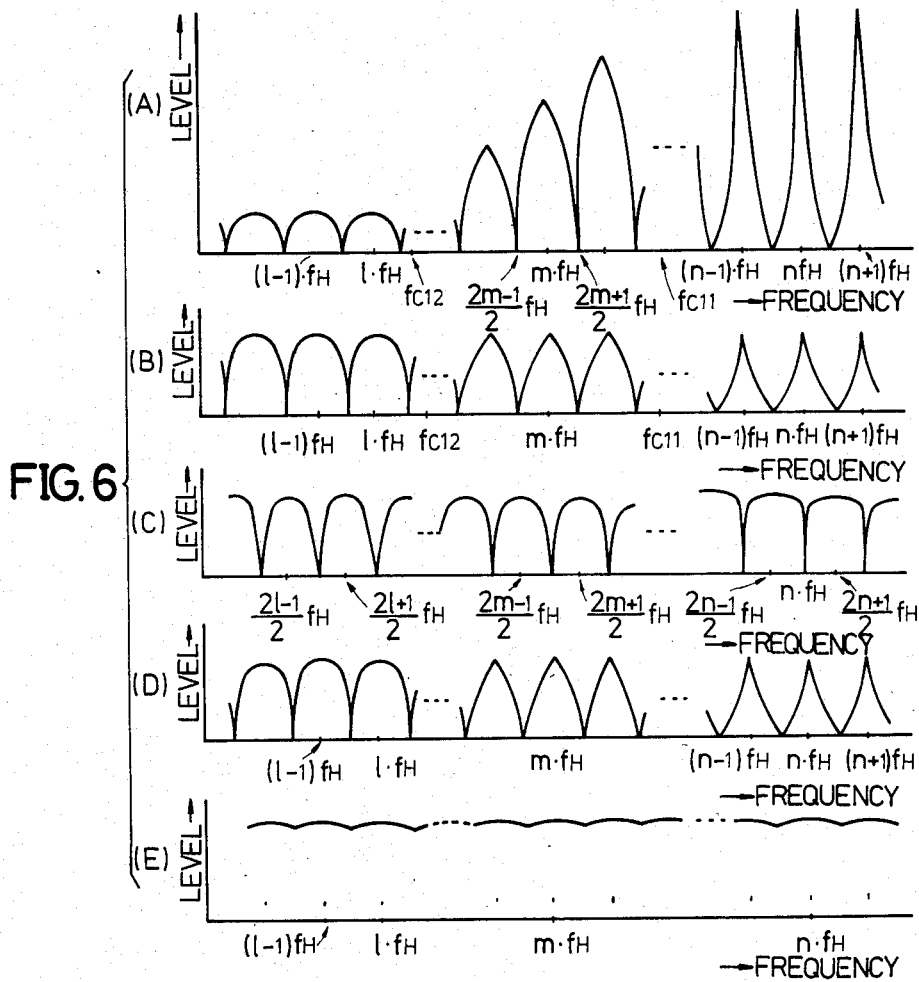
FIGS. 6(A) through 6(E) show frequency spectrums for explaining the operation of the circuit system shown in FIG. 5.

Next, description will be given with respect to a second embodiment of the noise reduction circuit according to the present invention by referring to FIG. 5. In FIG. 5, those parts which are the same as those corresponding parts in FIG. 3 are designated by the same reference numerals, and their description will be omitted. In a noise reduction circuit 40 shown in FIG. 5, the output video signal of the equalizer circuit 38 is supplied to a subtracting circuit 41 which subtracts the output video signal of the equalizer circuit 38 from the input video signal obtained through the input terminal 31. As a result, a frequency characteristic shown in FIG. 6(C) is obtained as the output of the subtracting circuit 41. This frequency characteristic is obtained by subtracting the frequency characteristic shown in FIG. 6(B) (identical to the frequency characteristic shown in FIG. 4(C) which is obtained at the output of the equalizer circuit 38, from a frequency characteristic which is flat throughout the entire frequency band.

In the frequency characteristic shown in FIG. 6(C), the center frequencies of the pass bands are odd number multiples of $f_H/2$, the center frequencies of the attenuation bands are even number multiples of $f_H/2$, and the pass band characteristic in the high-frequency band over the frequency $f_{c11}$ is flat compared to the pass band characteristic in the low-frequency band under the frequency $f_{c12}$. In other words, the center frequencies of the pass bands and the center frequencies of the attenuation bands is the frequency characteristic shown in FIG. 6(C) which is obtained at the output of the subtracting circuit 41, respectively correspond to the center frequencies of the attenuation bands and the center frequencies of the pass bands in the frequency characteristic shown in FIG. 6(A) which is obtained at the output of the comb filter 37 and in the frequency characteristic shown in FIG. 6(B) which is obtained at the output of the equalizer circuit 38.

The output signal of the subtracting circuit 41 having the frequency characteristic shown in FIG. 6(C), is made up of the noise included within the input video signal (reproduced luminance signal) and the video signal component having no vertical correlation. This output signal of the subtracting circuit 41 is supplied to a clipping circuit 42. The clipping level of the clipping circuit 42 is selected in the range of a peak-to-peak level of the noise within the output signal of the subtracting circuit 41. The clipping circuit 42 has a known construction, and is designed to block a signal having a level which is smaller than the clipping level and to pass a signal having a level which is larger than the clipping level.

An output signal of the clipping circuit 42 is supplied to an adding circuit 43, and is added with the output video signal of the equalizer circuit 38. An output signal of the adding circuit 43 is obtained through an output terminal 44. In a case where the input video signal has a small level change (a strong vertical correlation), the level of the output signal of the subtracting circuit 41 is smaller than the clipping level of the clipping circuit 42, and no output is obtained from the clipping circuit 42. Accordingly, a video signal having a frequency characteristic shown in FIG. 6(D) (identical to the frequency characteristic shown in FIG. 6(B) which is obtained at the output of the equalizer circuit 6(B), is obtained through the output terminal 44.

On the other hand, in a case where the input video signal has a large level change (virtually no vertical correlation), the video signal component having no vertical correlation is included within the input video signal to a large extent. Thus, the level of the video signal component which has no vertical correlation and is obtained from the subtracting circuit 41, is larger than the clipping level of the clipping circuit 42. Because the adding circuit 43 adds the output signal of the clipping circuit 42 and the output signal of the equalizer circuit 38, a video signal having a frequency characteristic shown in FIG. 6(E) is obtained from the adding circuit 43. This frequency characteristic shown in FIG. 6(E) is obtained by adding the frequency characteristics shown in FIGS. 6(B) and 6(C), and is substantially flat throughout the entire frequency band.

Accordingly, in the case where a strong vertical correlation exists in the input video signal, the video signal having the frequency characteristic shown in FIG. 6(D) is obtained through the output terminal 44 of the noise reduction circuit 40, as in the case of the noise reduction circuit 30 described before as the first embodiment. According to the present embodiment, it is possible to obtain a satisfactory S/N ratio improvement factor approximately throughout the entire frequency band, without deteriorating the vertical resolution to a large extent in the low-frequency band. On the other hand, in the case where the video signal component having no vertical correlation is included within the input video signal to a large extent, it is undesirable to improve the S/N ratio by use of the frequency characteristic shown in FIG. 6(D). This is because an error will occur and the waveform of the video signal obtained through the output terminal 44 will be different from the original waveform of the input video signal. However, in the present embodiment, the noise reduction circuit 40 uses the frequency characteristic shown in FIG. 6(E) in such a case. Since the frequency characteristic shown in FIG. 6(E) is substantially flat throughout the entire frequency band, it is possible to minimize the error introduced in the waveform of the video signal due to the operation of improving the S/N ratio. In other words, it is possible to obtain a video signal having no deterioration in the vertical resolution. According to the noise reduction circuit 40, one of the operation of improving the S/N ratio and the operation of compensating for the deterioration in the vertical resolution, has priority over the other, so as to perform an optimum signal processing depending on the extent to which the video signal component having no vertical correlation is included within the input video signal.

The frequency characteristic of the noise reduction circuit 40 becomes as shown in FIG. 6(E) in a case where the video signal component having no vertical correlation is included within the input video signal to an extremely large extent. On the other hand, the frequency characteristic of the noise reduction circuit 40 becomes as shown in FIG. 6(D) in a case where the video signal component having no vertical correlation is only included within the input video signal to an extremely small extent. But in an inbetween case where the video signal component having no vertical correlation is included within the input video signal to a certain extent, a signal having a level which is dependent on the extent to which the video signal component having no vertical correlation is included within the input video signal, is obtained from the clipping circuit 42. For this reason, the pass bands in the frequency characteristic of the noise reduction circuit 40 gradually become wider in the frequency band over the frequency $f_{c12}$, in accordance with the level of the signal component having no vertical correlation. As a result, the pass bands in the frequency band over the frequency $f_{C12}$ in the frequency characteristic of the noise reduction circuit 40, become approximately equal to the pass bands in the frequency band under the frequency $f_{c12}$, and the frequency characteristic of the noise reduction circuit 40 becomes as shown in FIG. 6(E).

Figure 7:
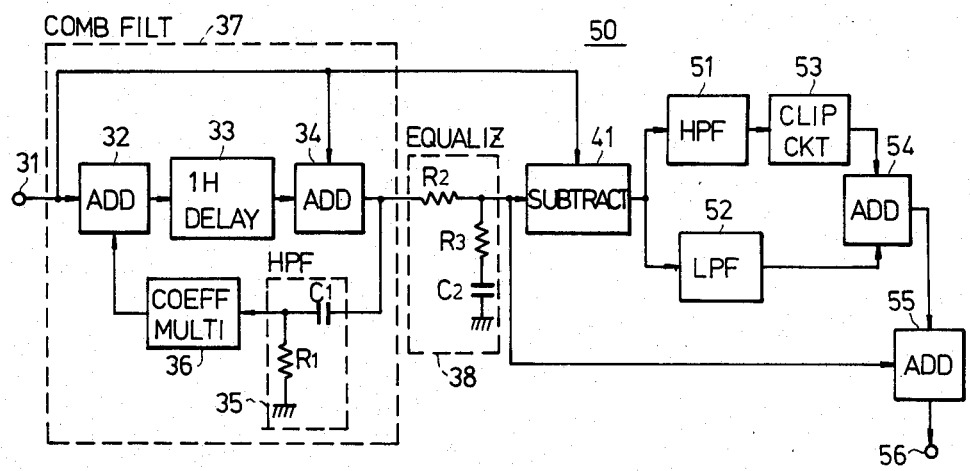
FIG. 7 is a systematic circuit diagram showing a third embodiment of the noise reduction circuit according to the present invention.

Next, description will be given with respect to a third embodiment of the noise reduction circuit according to the present invention, by referring to FIG. 7. In FIG. 7, those parts which are the same as those corresponding parts in FIG. 5 are designated by the same reference numerals, and their description will be omitted.

In FIG. 7, the output signal of the subtracting circuit 41 within a noise reduction circuit 50, is supplied to a highpass filter 51 having a cutoff frequency $f_{c2}$, and to a lowpass filter 52 having a cutoff frequency $f_{c3}$. The cutoff frequencies $f_{c2}$ and $f_{c3}$ are equal to each other, and are selected to approximately 300 kHz, for example. Accordingly, the output signal of the subtracting circuit 41 is band-divided into two about the frequencies $f_{c2}$ and $f_{c3}$ by the highpass filter 51 and the lowpass filter 52. A high-frequency component which is obtained from the highpass filter 51, is supplied to a clipping circuit 53. On the other hand, a low-frequency component which is obtained from the lowpass filter 52, is supplied to an adding circuit 54. The clipping circuit 53 has a construction similar to the construction of the clipping circuit 42 described before, and supplies to the adding circuit 54 a signal having a level which is larger than the clipping level. The output video signal of the equalizer circuit 38 is supplied to an adding circuit 55, and is added with an output signal of the adding circuit 54. An output signal of the adding circuit 55 is obtained through an output terminal 56.

Therefore, a frequency characteristic obtained at the output terminal 56 is constantly flat in the low-frequency band under the cutoff frequency $f_3$ regardless of the extent to which the video signal having no vertical correlation is included within the input video signal, and changes in the high-frequency band over the cutoff frequency $f_{c2}$ depending on the extent to which the video signal component having no vertical correlation is included within the input video signal, as in the case of the noise reduction circuit 40 described before.

Figure 8:
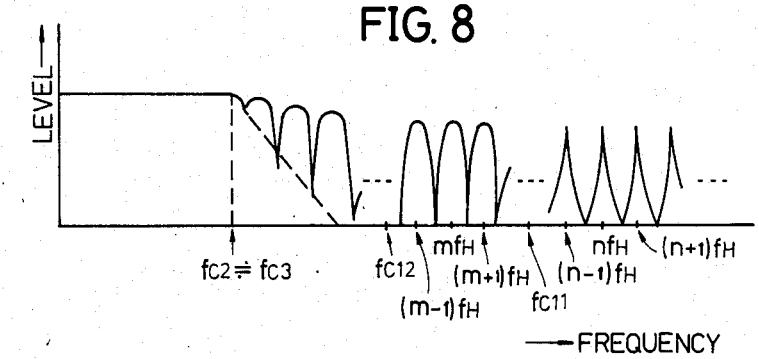
FIG. 8 shows a frequency spectrum for explaining the operation of the circuit system shown in FIG. 7.

In other words, in the case where the input video signal includes the video signal component having no vertical correlation, the level of the signal component within the output signal of the subtracting circuit 41, is small compared to the level of the noise component. The signal component and the noise component within the output signal of the subtracting circuit 41, which are in the high-frequency band over the cutoff frequency $f_{c2}$ of the highpass filter 51, are blocked in the clipping circuit 53. Hence, the frequency characteristic of the noise reduction circuit 50 at the output terminal 56 becomes as shown in FIG. 8. As may be seen from FIG. 8, it is possible to obtain through the output terminal 56 a video signal in which only the noise is reduced and the deterioration in the vertical resolution is minimized, even in the low-frequency band between the frequencies $f_{c12}$ and $f_{c2}$ (or $f_{c3}$). In addition, since the comb filter characteristic is not obtained in the low-frequency band under the cutoff frequency $f_{c2}$ (or $f_{c3}$), the input video signal is passed as it is in this low-frequency band, and there is no deterioration in the vertical resolution in this low-frequency band.

On the other hand, in a case where the video signal component having no vertical correlation is included within the input video signal to a large extent, the level of the signal component within the output signal of the subtracting circuit 41 is large compared to the level of the noise component. A frequency component which is within the output signal of the subtracting circuit 41 and has a frequency over the cutoff frequency $f_{c2}$, is passed through the clipping circuit 53 and is supplied to the adding circuit 54. Accordingly, in this case, a frequency characteristic obtained at the output terminal 56 is substantially flat in the frequency band over the frequency $f_{c2}$, as in the frequency characteristic shown in FIG. 6(E), and further, the frequency characteristic is flat in the low-frequency band under the frequency $f_{c3}$ ($\approx f_{c2}$). Thus, the input video signal is produced through the output terminal 56 as it is, without introducing deterioration in the vertical resolution.

Figure 9:
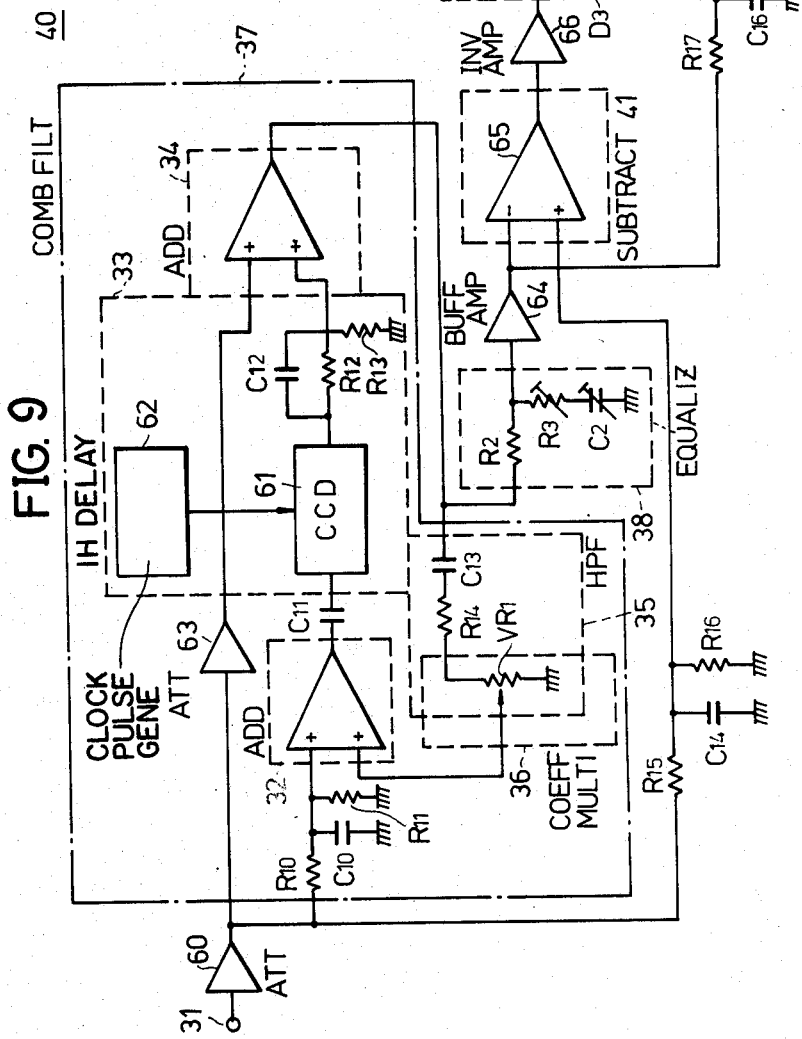
FIG. 9 is a circuit diagram showing the circuit system shown in FIG. 5 in more detail.

Next, description will be given with respect to a concrete circuit of the noise reduction circuit 40 according to the present invention, by referring to FIG. 9. In FIG. 9, those parts which are the same as those corresponding parts in FIG. 5 are designated by the same reference numerals, and their description will be omitted.

In FIG. 9 the input video signal applied to the input terminal 31, is attenuated in an attenuator 60, and is supplied to a delay circuit which is provided for the purpose of matching the timing of signals. This delay circuit comprises resistors $R_{10}$ and $R_{11}$ and a capacitor $C_{10}$. An output signal of this delay circuit is passed through the adding circuit 32 and a coupling capacitor $C_{11}$, and is supplied to a charge coupled device (CCD) 61. The CCD 61 delays the video signal supplied thereto by a delay time of 1H, responsive to a clock pulse from a clock pulse generator 62. An output delayed video signal of the CCD 61 is passed through a lowpass filter which comprises resistors $R_{12}$ and $R_{13}$ and a capacitor $C_{12}$, and is eliminated of the clock pulse component. An output signal of this lowpass filter is supplied to the adding circuit 34, and is added with an output signal of an attenuator 63. The attenuator 63 attenuates the output video signal of the attenuator 60 by approximately 6 dB.

The highpass filter comprises a resistor $R_{14}$, a capacitor $C_{13}$, and a variable resistor $VR_1$. The coefficient multiplier 36 comprises the variable resistor $VR_1$. The output signal of the adding circuit 34 is supplied to the highpass filter 35. On the other hand, the output signal of the adding circuit 34 is passed through the equalizer circuit 38 and a buffer amplifier 64, and is supplied to one input terminal of a differential amplifier 65. The output video signal of the attenuator 60 is passed through a delay circuit which comprises resistors $R_{15}$ and $R_{16}$ and a capacitor $C_{14}$, and is supplied to the other input terminal of the differential amplifier 65. This delay circuit is provided for the purpose of matching the timing of signals, and has a delay time of 10 nsec, for example. The differential amplifier 65 constitutes the subtracting circuit 41, and an output signal of the differential amplifier 65 is supplied to an inverting amplifier 66 and is amplified by approximately 12 dB. An output signal of the inverting amplifier 66 is supplied to the clipping circuit 42.

The clipping circuit 42 comprises four germanium diodes $D_1$ through $D_4$, a capacitor $C_{15}$, and a variable resistor $VR_2$. Cathodes of the diodes $D_1$ and $D_2$, and anodes of the diodes $D_3$ and $D_4$, are commonly connected to a non-grounded terminal of the capacitor $C_{15}$ and to a non-grounded terminal of the variable resistor $VR_2$. A differential amplifier 67 constitutes the adding circuit 43. An output video signal of the buffer amplifier 64, is passed through a delay circuit which comprises resistors $R_{17}$ and $R_{18}$, and coil L, and capacitors $C_{16}$ and $C_{17}$, and is supplied to a non-inverting input terminal of the differential amplifier 67. This delay circuit is provided for the purpose of matching the timing of signals, and has a delay time of several tens of nsec, for example. A signal which is obtained through a slider of the variable resistor $VR_2$, is supplied to an inverting input terminal of the differential amplifier 67.

For example, constants of the circuit elements shown in FIG. 9 are selected as follows.

$R_2 = R_3 = R_{12} = R_{13} = R_{14} = R_{17} = R_{18} = VR_1 = 1\ k\Omega$ $C_{11} = 0.1\ \mu F$ $C_2 = C_{13} = 120\ pF$ $C_{12} = C_{17} = 27\ pF$ $C_{14} = 22\ pF$ $C_{15} = 180\ pF$ $C_{16} = 5\ pF$ The present invention is not limited to the embodiments described heretofore. For example, since there is a predetermined limit to the frequency band of the input video signal which is applied to the input terminal 31, it is possible to employ a bandpass filter having a cutoff frequency which is in the range of a maximum frequency of the input video signal.

Figure 10:
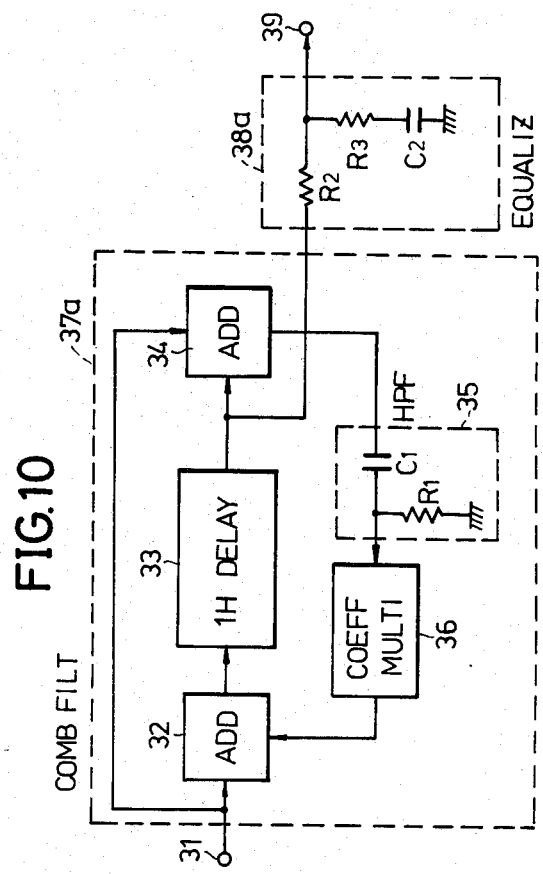
FIG. 10 is a systematic circuit diagram showing a modification of the noise reduction circuit according to the present invention.

In addition, the output signal of the 1H delay circuit 33 may be supplied to the equalizer circuit 38 shown in FIG. 3. This modification is shown in FIG. 10. In FIG. 10, those parts which are the same as those corresponding parts in FIG. 3 are designated by the same reference numerals, and their description will be omitted. In this case, when the input signal voltage applied to the input terminal 31 is represented by $e_i$ and the output signal voltage of the adding circuit 34 is represented by $e_o$ as described before, the output signal voltage of the 1H delay circuit 33 becomes equal to $(e_o - e_i)$, and a transfer function of a feedback type comb filter 37a shown in FIG. 10 can be described by the following equation (4), where the coefficients k and T are the same as the coefficients k and T in the equations (1) through (3) described before.

$$(e_o - e_i)/e_i = [1 + j\omega(1+k)T]/[1 + j\omega(1-k)T] \quad (4)$$

Accordingly, the envelope characteristic in the frequency characteristic of the feedback type comb filter 37a, is similar to the envelope characteristic I shown in FIG. 4(A), but in this case, a frequency corresponding to the frequency $f_{c11}$ is determined by $(1-k)T$ and a frequency corresponding to the frequency $f_{c12}$ is determined by $(1+k)T$. Further, the circuit construction of an equalizer circuit 38a shown in FIG. 10 is the same as the circuit construction of the equalizer circuit 38, but in this case, the resistance of the resistor $R_2$ is selected to $2kR_1$ and the resistance of the resistor $R_3$ is selected to $(1-k)R_1$. In this case, $C_1 = C_2$ as in the case of the equalizer circuit 38.

Figure 11:
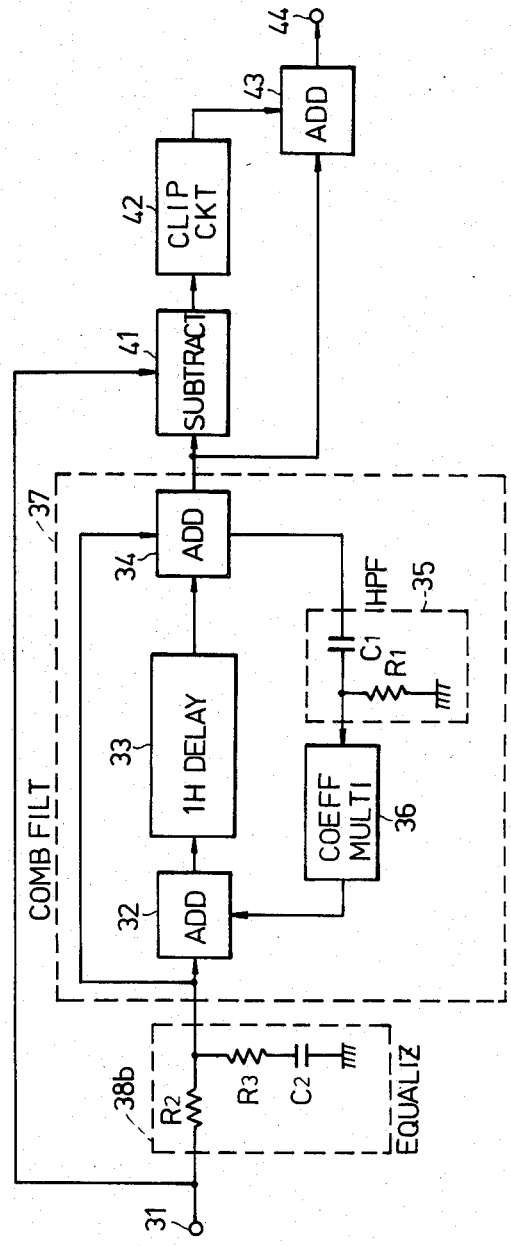
FIG. 11 is a systematic circuit diagram showing another modification of the noise reduction circuit according to the present invention.

In addition, the equalizer circuit 38 may be provided on the input side of the feedback type comb filter 37 shown in FIG. 5. FIG. 11 shows a modification in which an equalizer circuit 38b is provided on the input side of the feedback type comb filter 37. In FIG. 11, those parts which are the same as those corresponding parts in FIG. 5 are designated by the same reference numerals, and their description will be omitted. In this case, the subtracting circuit 41 must be designed to perform a subtraction between the output video signal of the feedback type comb filter 37 and the input video signal applied to the input terminal 31.

The input video signal which is applied to the input terminal 31, is not limited to the luminance signal, and for example, color difference signals or a carrier chrominance signal may be applied to the input terminal 31. In a case where the carrier chrominance signal is applied to the input terminal 31, it is necessary to use an equalizer circuit having a frequency characteristic which is symmetrical about the chrominance subcarrier frequency, within a frequency range of $\pm \Delta f$ from a center frequency which is equal to the chrominance subcarrier frequency, instead of the highpass filter 35. This is because the output carrier chrominance signal will become non-symmetrical about the chrominance subcarrier frequency when the highpass filter 35 is used. Moreover, when the noise reduction circuit according to the present invention is used with respect to the carrier chrominance signal, it is necessary to design the adding circuit 34 to perform a subtraction.

In addition, the present invention can be applied to the noise reduction of a luminance signal within a PAL system or SECAM system color video signal, and also to a carrier chrominance signal within the PAL system color video signal. In this case, it is possible to use a 2H delay circuit instead of the 1H delay circuit.

Further, the present invention is not limited to these embodiments, but various variations and modifications may be made without departing from the scope of the present invention.

What is claimed is:

1. A noise reduction circuit for a video signal, said noise reduction circuit comprising:
    an input terminal for receiving an input video signal;
    a feedback type comb filter in which an output signal of a delay circuit which delays said input video signal by one or two horizontal scanning periods, is fed back to an input side of said delay circuit through a feedback path, said feedback path comprising a filter circuit having such a filtering characteristic that said feedback type comb filter has a predetermined envelope characteristic in a frequency characteristic of said feedback type comb filter and a coefficient multiplier which are coupled in series; and an equalizer circuit supplied with an output signal of said feedback type comb filter, said equalizer circuit having a frequency characteristic complementary to the predetermined envelope characteristic in the frequency characteristic of said feedback type comb filter.

2. A noise reduction circuit as claimed in claim 1 in which said feedback type comb filter comprises an operation circuit for performing an addition of the output signal of said delay circuit and said input video signal, said feedback path being supplied with an output signal of said operation circuit, said filter circuit of said feedback path passing a high-frequency component of the output signal of said operation circuit, said coefficient multiplier of said feedback path multiplying a coefficient to the high-frequency component, and an adding circuit for adding an output signal of said feedback path and said input video signal, and for supplying an output signal to said delay circuit.

3. A noise reduction circuit for a video signal, said noise reduction circuit comprising: an input terminal for receiving an input video signal;

a feedback type comb filter in which an output signal of a delay circuit which delays said input video signal by one or two horizontal scanning periods, is fed back to an input side of said delay circuit through a feedback path, said feedback path comprising a filter circuit having such a filtering characteristic that said feedback type comb filter has a predetermined envelope characteristic in a frequency characteristic of said feedback type comb filter and a coefficient multiplier which are coupled in series;

an equalizer circuit supplied with an output signal of said feedback type comb filter, said equalizer circuit having a frequency characteristic complementary to the predetermined envelope characteristic in the frequency characteristic of said feedback type comb filter;

a subtracting circuit for performing a subtraction between said input video signal and an output signal of said equalizer circuit;

a clipping circuit supplied with an output signal of said subtracting circuit, for only passing a signal having a level which is larger than a clipping level of said clipping circuit;

a first adding circuit for adding an output signal of said clipping circuit and the output signal of said equalizer circuit; and an output terminal through which an output signal of said first adding circuit is outputted as an output video signal of said noise reduction circuit.

4. A noise reduction circuit as claimed in claim 3 in which said feedback type comb filter comprises an operation circuit for performing an addition of the output signal of said delay circuit and said input video signal, said feedback path being supplied with an output signal of said operation circuit, said filter circuit of said feedback path passing a high-frequency component of the output signal of said operation circuit, said coefficient multiplier of said feedback path multiplying a coefficient to the high-frequency component, and a second adding circuit for adding an output signal of said feedback path and said input video signal, and for supplying an output signal to said delay circuit.

5. A noise reduction circuit for a video signal, said noise reduction circuit comprising:

an input terminal for receiving an input video signal;

a feedback type comb filter in which an output signal of a delay circuit which delays said input video signal by one or two horizontal scanning periods, is fed back to an input side of said delay circuit through a feedback path, said feedback path comprising a filter circuit having such a filtering characteristic that said feedback type comb filter has a predetermined envelope characteristic in a frequency characteristic of said feedback type comb filter and a coefficient multiplier which are coupled in series;

an equalizer circuit supplied with an output signal of said feedback type comb filter, said equalizer circuit having a frequency characteristic complementary to the predetermined envelope characteristic in the frequency characteristic of said feedback type comb filter;

a subtracting circuit for performing a subtraction between said input video signal and an output signal of said equalizer circuit;

filter means for dividing a frequency component of an output signal of said subtracting circuit into two frequency bands so as to obtain a high-frequency component and a low-frequency component;

a clipping circuit supplied with the high-frequency component obtained from said filter means, for only passing a signal having a level which is larger than a clipping level of said clipping circuit;

adding means for adding the low-frequency component obtained from said filter means, an output signal of said clipping circuit, and the output signal of said equalizer circuit; and an output terminal through which an output signal of said adding means is outputted as an output video signal of said noise reduction circuit.

6. A noise reduction circuit as claimed in claim 5 in which said feedback type comb filter comprises an operation circuit for performing an addition of the output signal of said delay circuit and said input video signal, said feedback path being supplied with an output signal of said operation circuit, said filter circuit of said feedback path passing a high-frequency component of the output signal of said operation circuit, said coefficient multiplier of said feedback path multiplying a coefficient to the high-frequency component, and an adding circuit for adding an output signal of said feedback path and said input video signal, and for supplying an output signal to said delay circuit.

7. A noise reduction circuit for a video signal, said noise reduction circuit comprising:

an input terminal for receiving an input video signal;

an equalizer circuit supplied with said input video signal from said input terminal;

a feedback type comb filter comprising a delay circuit for delaying an output signal of said equalizer circuit to produce a delayed video signal, said delayed video signal being fed back to an input side of said delay circuit through a feedback path, said feedback path comprising a filter circuit having such a filtering characteristic that said feedback type comb filter has a predetermined envelope characteristic in a frequency characteristic of said feedback type comb filter and a coefficient multiplier which are coupled in series, said equalizer circuit having a frequency characteristic complementary to the predetermined envelope characteristic in the frequency characteristic of said feedback type comb filter;

a subtracting circuit for performing a subtraction between said input video signal and an output signal of said feedback type comb filter;

a clipping circuit supplied with an output signal of said subtracting circuit, for only passing a signal having a level which is larger than a clipping level of said clipping circuit;

a first adding circuit for adding an output signal of said clipping circuit and the output signal of said feedback type comb filter; and an output terminal through which an output signal of said first adding circuit is outputtted as an output video signal of said noise reduction circuit.

8. A noise reduction circuit as claimed in claim 7 in which said feedback type comb filter comprises an operation circuit for performing an addition of the delayed video signal and said output signal of said equalizer circuit, said feedback path being supplied with an output signal of said operation circuit, said filter circuit of said feedback path passing a high-frequency component of the output signal of said operation circuit, said coefficient multiplier of said feedback path multiplying a coefficient to the high-frequency component, and a second adding circuit for adding an output signal of said feedback path and said output signal of said equalizer circuit, and for supplying an output signal to said delay circuit.

9. A noise reduction circuit as claimed in claim 2 in which said equalizer circuit is supplied with the output signal of said operation circuit as the output signal of said feedback type comb filter.

10. A noise reduction circuit as claimed in claim 2 in which said equalizer circuit is supplied with the output signal of said delay circuit as the output signal of said feedback type comb filter.

* * * * *